US006871746B2

(12) United States Patent
Rettenmaier

(10) Patent No.: US 6,871,746 B2
(45) Date of Patent: Mar. 29, 2005

(54) ANCILLARY FILTERING AGENT

(75) Inventor: Josef Otto Rettenmaier, Rosenberg (DE)

(73) Assignee: Herzog, Stefan, Munich (DE)

( * ) Notice: Subject to any disclaimer, the term of this patent is extended or adjusted under 35 U.S.C. 154(b) by 29 days.

(21) Appl. No.: 09/380,731

(22) PCT Filed: Mar. 4, 1998

(86) PCT No.: PCT/DE98/00630

§ 371 (c)(1),
(2), (4) Date: Sep. 13, 1999

(87) PCT Pub. No.: WO98/40149

PCT Pub. Date: Sep. 17, 1998

(65) Prior Publication Data

US 2002/0070161 A1 Jun. 13, 2002

(30) Foreign Application Priority Data

Mar. 13, 1997 (DE) .......................... 197 10 315

(51) Int. Cl.$^7$ .......................... B01D 39/04; B01D 39/00
(52) U.S. Cl. ..................... 210/503; 210/500.1; 210/505
(58) Field of Search ................ 210/483, 488, 210/489, 490, 500.1, 503, 505, 506, 507, 508, 509; 162/1, 90, 91, 141, 145

(56) References Cited

U.S. PATENT DOCUMENTS

| | | | | |
|---|---|---|---|---|
| 4,288,462 A | * | 9/1981 | Hou et al. | 210/777 |
| 4,361,486 A | * | 11/1982 | Hou et al. | 210/722 |
| 4,366,068 A | * | 12/1982 | Ostericher et al. | 210/767 |
| 4,367,150 A | * | 1/1983 | Hiesinger et al. | 210/777 |
| 4,486,267 A | * | 12/1984 | Prusas | 162/25 |
| 4,488,969 A | * | 12/1984 | Hou | 210/679 |
| 4,599,240 A | * | 7/1986 | Thompson | 426/534 |
| 5,769,934 A | * | 6/1998 | Ha et al. | 108/162.8 |
| 5,866,242 A | * | 2/1999 | Tan et al. | 428/219 |
| 5,916,670 A | * | 6/1999 | Tan et al. | 428/219 |

FOREIGN PATENT DOCUMENTS

| | | |
|---|---|---|
| DE | 2 351 125 | 5/1974 |
| DE | 29 15 677 | 11/1980 |
| DE | 41 10 252 | 2/1992 |
| EP | 0 747 104 | 12/1996 |
| FR | 385 035 | 4/1908 |
| FR | 534 288 | 3/1922 |
| FR | 1 602 293 | 12/1970 |

OTHER PUBLICATIONS

Toshio; "Filter Aid"; Patent Abstracts of Japan; vol. 17, No. 388; Jul. 21, 1993; JP 05 068878; Mar. 23, 1993; Abstract.
Toshiaki; "Composite For Filtration And Clarifying Method For Liquid"; Patent Abstracts of Japan; vol. 5, No. 89; Jun. 10, 1981; & JP 56 033018; Apr. 3, 1981; Abstract.
Isao; "A Fluid Treatment Process By Organic Filter Media"; Patent Abstracts of Japan; vol. 1, No. 29.; Mar. 28, 1977; & JP 51 151269; Dec. 25, 1976; Abstract.
Tomomichi; "Filtration Filter"; Patent Abstracts of Japan; JP 07 328353; Dec. 19, 1995; Abstract.
J. Speckner Munchen; Cellulose als Filterhilfsmittel; Brauwelt; 1984; 8 sheets( no translation).
Wilhelm Foerst; Ullmans Encyklopadie der technischen Chemie; 1951; 3 sheets(No Translation).

* cited by examiner

*Primary Examiner*—John Kim
(74) *Attorney, Agent, or Firm*—Foley & Lardner LLP

(57) ABSTRACT

The filter aid comprises finely divided plant fibers, which for a period of action have been subjected to a liquid treatment, which removes the sensorially active substances from the plant fibers.

34 Claims, No Drawings

ANCILLARY FILTERING AGENT

BACKGROUND OF THE INVENTION

1. Field of the Invention

The invention relates to a filter aid, a process for its production and its application.

2. Description of the Related Art

Cellulose-based filter aids have been known for a long time ("Ullmann's Encyklopädie der Technischen Chemie", $3^{rd}$ edition (1951), first volume, page 492, key word "felted layers" and page 493, key word "filter aids"). Cellulose is produced in a multi-step chemical process, in which all sensorially active materials are removed from the raw material.

Hence filter aids made of pure cellulose are used wherever the sensorial neutrality of the used filter aid is of great significance. Examples of cellulosis filter aids are EFC (low extract cellulose), fine powder cellulose, fine fibrillated cellulose cationized powder cellulose, fine MCC (microcrystalline cellulose).

In contrast, filter aids made of untreated woodpulp are produced by mechanical comminution, thus only by physical treatment, and can, thus, release extractives (color, odor, flavor) during filtration. Therefore, the use of wood fiber-based filter aids is usually limited to industrial filtrations, where relatively little demand is placed on the sensory analysis.

Not only for filtration in the food and luxury food sector, but also for many industrial applications, they may not be considered, e.g. for sugar solutions (glucose, dextrose, fructose), molasses, dye solutions, fats and oils and the like.

The difficult field of beverage filtration demands, on the one hand, complete sensorial neutrality of the used filter aid; on the other hand, the number of commonly used filter aids are limited for economic reasons, since the maximum expense for the filter aid is fixed by the price of the mineral filter aids dominating this market.

Usually beer filtration take place in two steps. The first step usually involves a coarse filtration, during which operation the liquid usually passes through a precoated layer of a filter aid. This step is frequently followed by a fine filtration (membrane, kieselguhr, etc.).

The standard filter aid for the precoat-type filter in the beverage, especially beer, sector, is kieselguhr. A high percentage of the world beer production is clarified by kieselguhr filtration. Currently it exceeds more than 1.1 billion hecto liter of beer.

The total demand for filter aids is worldwide ca. 750,000 tons per year, where inorganic materials, like, for example, kieselguhr, perlite or bentonite, constitute by far the largest share of this amount. Of this total amount about 250,000 tons to 300,000 tons per year are consumed worldwide by the beverage industry, largely by the breweries, but also by producers of wine and fruit juices.

The amount of filter aids, which are based on organic raw materials that can regrow again (cellulose, woodpulp, etc.), is to date only ca. 20,000 tons per year, even though their use offers a plurality of advantages over inorganic filter aids.

Thus organic filter aids are natural materials, whose quality fluctuates only over a narrow range and whose occurrence can be renewed at regular intervals. In addition the use of organic filter aids presents neither a health risk nor harmful effects for the environment and nature. Pumps and conveying elements of the filtration system are protected as much as possible owing to the non-abrasive property. Finally the consumed filter cakes can be easily disposed, for example, through land management, composting or animal fodder.

Of course, organic filter aids are in part many times more expensive than kieselguhr or they exhibit filtration properties that do not completely match those of kieselguhr.

For this reason organic filter aids have not been able to prevail to date against kieselguhr or are used in any case together with kieselguhr (report by J. Speckner "Cellulose as Filter Aids" in the journal ("Brauwelt", vol. 124 (1984), issue 46, pages 2058 to 2066, in particular page 2062, left column top).

However, kieselguhr has become increasingly a problem. As a natural mineral material its occurrence is limited. Thus in the case of kieselguhr one must resort more and more to low grade qualities in order to meet the high demand of industry. The result is, however, a rising cost for the cleaning and processing of kieselguhr, which could in the long run have a negative impact on its economic, situation.

An even greater impact presents, however, the fact that the users' attitude towards kieselguhr is becoming more critical.

This reservation stems from the problems posed to the lungs due to many natural mineral materials and hence kieselguhr, a feature that must be taken very seriously from the point of view of occupational medicine. In 1988 the World Health Organization (WHO) categorized kieselguhr as a carcinogenic substance following a series of animal experiments. For handling there are strict regulations that are being asserted and observed more and more in Germany.

Another factor is that the disposal of kieselguhr is becoming increasingly more critical in industrial countries. A classification as hazardous waste makes landfilling considerably more difficult. With the introduction of the new technical rules on municipal waste, the disposal situation for kieselguhr is becoming more restrictive. In many cases, disposal of kieselguhr used as filter aid already gives rise to costs of approximately DM 600,000 per ton of kieselguhr, if this was used in beer filtration, or 1500.00 per ton of kieselguhr if this was used in the industrial filtration of problematic substances.

SUMMARY OF THE INVENTION

Starting from these urgent problems in particular in the beer filtration sector, the object underlying the invention is to develop a filter aid which is effective and can be provided economically.

Substances which are sensorially active, that is active with respect to color, odor and/or flavor, are to be removed from the filter aid to a sufficient extent prior to use as filter aid, so that none of these substances can transfer into the filtrate to a significant extent and impair its sensory properties. The particles are neutralized sufficiently to a certain extent sensorially in order to be able to serve as filter aid. It is essential here that the treatment is only carried out to the extent necessary for this purpose. The use of energy and chemicals remains in a justifiable range, so that the product can compete economically with kieselguhr. The action is therefore not so intensive as is the case in the production of cellulose from wood fibers. Surprisingly, it has been found that by means of a liquid treatment a sufficient neutralization of the particles with respect to sensory aspects can be achieved without the need for simultaneously high pressures and temperatures to be employed, large amounts of aggressive chemicals and treatment times of many hours to days. By means of the invention, to a certain extent an expanded area of application is open to the wood particles, without this needing expenditure as in the case of cellulose production.

Although the starting point and preferred area of application for the invention is beer and beverage filtration, which concerns the creation of a kieselguhr substitute material, the invention is not restricted to this area of application.

Although DE 23 51 125 Al discloses using, for the extraction of metals or metal ions from solutions, an adsorbent which is obtained by bringing, inter alia, wood sawdust into contact with a solution of a hydroxide of an alkali metal or alkaline earth metal, this is an adsorption, i.e. an accumulation of dissolved particles on the surface of the adsorbent, not a filtration, i.e. a separation from a suspension.

In the case of DE 41 10 252 C1, for prefloating a filter cake, a mixture of filter aids of differing morphological and physical properties is used which comprise at least one component which increases the density of the filter cake and is made of high-density, chemically resistant metal and/or metal oxide and/or carbon particles of fibrous and/or granular structure and a further component of plastic fibers and/or cellulose fibers having a fiber length of from 1000 to 5000 $\mu$m and a fiber thickness of from 0.5 to 100 $\mu$m.

The wood particles of the filter aid according to the invention comprise, for example, wood fibers or, in particular, wood comminution residues, that is for example sawdust, sanding dust, wood shavings, wood chips, cutting waste, chipped wood and the like.

The grinding performed in the production of the wood particles in the invention substantially determines the filtration properties. With fine grinding, the permeability of the filter layer is generally lower. By means of the grinding (micronization, fibrillation), in addition the particle shape is affected which in turn changes the water value, which is still to be explained, as a measure of the permeability of the filter layer. In the case of fibrous cellulose products these can be fibrilated to a greater or lesser extent. The grinding can also be performed in a plurality of steps in which a first grinding for the production of the particles is followed by a further grinding after the treatment and before or after the drying.

The filter aid particles produced from wood particles are still actually to have wood character, i.e. the lignin shall not have been virtually quantitatively extracted from the raw material wood, as occurs in cellulose production in the sulfite or sulfate process by treatment for many hours at elevated pressure at temperatures far above 100° C.

The treatment time in the invention can be relatively short, for example less than two hours, so that it is differentiated by one order of magnitude from the treatment time in the production of cellulose. The purpose is the removal, of only fractions of the wood which are unwanted with respect to the use as filter aid, i.e. have an effect in terms of flavor, odor and/or color in the filtrate. This is not in this case primarily lignin, but compounds such as essential oils, terpeheoils and terpenoids, tantic acids, fats and waxes, phenolic substances (lignans, phenylpropanes, coumarin) stilbenes, flavonoids and the like, which make up an amount of from approximately 4 to 5 percent by weight of the dry wood. It has been found that these compounds can be, by means of a treatment with dilute alkali solutions acids [sic] even at room temperatures under atmospheric pressure, extracted from the wood or else made inactive to the extent that the treated wood particles are sufficiently neutral sensorially for the practical use as filter aid. It is not the case that during a rigorous analysis no residues of the unwanted type can be observed any longer, but that, for example, a medium filtered using the filter aid does not permit, during sensory testing, any wood flavor or wood aroma or any brown discoloration to be recognized. The treatment can be brief relative to the treatment durations of cellulose production.

An important feature in the treatment of the particles is in addition, that the treatment can also take place at temperatures below 100° C. and simultaneously at atmospheric pressure, which substantially simplifies the plant required for producing the filter aid.

The filter aid of the invention can be prepared particularly economically. The costs may be in the same order of magnitude as the costs of kieselguhr, but only about one third of the costs for cellulose powder.

It also appears to be the case that the particles treated according to the invention have on the surface an additionally roughened or fissured structure which advantageously affects the filter properties.

Underlying the claimed invention is French Patent 385 035 which has, as its subject matter, wood fibers used for filter purposes which are treated, to avoid rotting, with a permanganate solution with or without addition of acid.

From JP-A 73 28 353, DE 41 10 252 C1 and EP 747 104 A2 can be taken the use of cellulose fibers that is not alkali-solution-treated wood particles mixed with other components as filter aid.

From FR 534 288 there arises a filter aid for wines, which aid consists of wood wool which is thoroughly washed and treated with 1% strength tartaric acid.

According to the invention the filter aid can comprise essentially only wood particles of one and the same type, size and pretreatment, that is can essentially be uniformly composed.

However, it is also possible according to the invention for the filter aid to comprise at least two particle fractions comminuted according to different processes, in order to be able to set the filtration properties in accordance with the requirements.

From the same aspect, the filter aid can comprise at least two particle fractions comminuted to different dimensions and/or at least two particles produced from different starting materials.

The filter aid can also comprise other fractions which do not affect the filtration properties.

It can also be a mixture with other filter-active constituents, i.e. not consisting of plant fibers, also with mineral constituents, namely with kieselguhr, which would have the effect of reducing the kieselguhr content and the associated problems mentioned at the outset.

However, suitable additional constituents are also other mineral filter aids, in particular perlite. According to the invention, the largest mean particle diameter of the ready-to-use filter aid shall be less than 3.0 mm. In contrast, in the case of fibrous particles, the mean fiber diameter shall be less than 1.0 mm.

Since the particles are produced by grinding, they do not have an exact size, but a size distribution for instance according to a Gaussian curve. The position of the maximum of this curve may be taken to mean here the highest particle dimension.

The filter aid of the invention can be used to form prefloat filter layers in the same manner as was previously the case with mineral filter aids.

The invention also extends to a process for preparing the filter aid in which the particles are digested by the treatment liquid in the course of a period of action.

A suitable temperature range in the treatment of the particles is the range of room temperature, which, although it requires no heating energy consumption, does require longer treatment times. A further practicable region with shorter treatment times is 50–100° C.

According to the invention, atmospheric pressure in the temperature range of 70 to 90° C. can be employed, which is a temperature markedly increased with respect to room temperature, but is below the boiling point and eliminates the use of pressure vessels. This leads to a usable filter aid with a minimum of equipment and energy consumption.

"Dilute alkali solution" shall mean an aqueous solution having a content of from 2 to 10% by weight of the dry alkali, based on the solids content. In the preferred embodiment of the invention, sodium hydroxide solution is used.

The period of action depends apart from the pressure and temperature, on the solution capacity of the dilute alkali solution for the unwanted constituents. In the case of dilute alkali solution, it is also the case that it is not periods of action in the seconds region which come into question, but those which are short in comparison with the periods of action of many hours to days necessary in cellulose production. The period of action is partly dependent on the particle size.

It is, moreover, of a size determined by the fact that precisely only the sensory-critical substances are to be removed from the particles, in particular the wood particles. The latter purpose is achieved when at most 10% by weight on an absolutely dry basis of the wood constituents are removed, whereas the production of cellulose relates to the liberation of generally more than 30% of the wood constituents.

The period of action can be, with an alkali solution treatment, in particular between 5 and 120 min. The consistency, i.e. the proportion by weight of the particles in the dilute alkali solution, can be from 5 to 25% in the treatment. The particles, after the period of action, can be washed and dried. The particle size (maximum of the particle size distribution) can be up to 10 mm, preferably 01 to 1.0 mm, during the treatment.

Since a grinding in the wet phase changes the particle shape, a possibility is opened up in this manner of setting the water value. In individual cases it is possible, without relinquishing the lack of sensory hazard to further comminute the particles after the alkali solution treatment and the drying, simultaneously with the drying or after the drying. To obtain clear conditions with respect to the filter properties, it is advisable to classify the particles after the alkali solution treatment and the drying.

The invention is also embodied in the use of finely divided wood particles which have been subjected to a treatment with a dilute lute [sic] at a temperature below 100° C. and at atmospheric pressure, which treatment removes the sensorially active substances from the wood particles, as filter aid, in particular when the particles have been treated. A suitable use is in particular in beverage filtration, in particular beer filtration.

Other fields of application of the invention are food filtration, for example sugar solutions, edible oil, fat, gelatin, citric acid, alginate etc., filtration in the chemical sector, for example chloralkali, in the sector of the cleaning of auxiliary liquids in metalworking, for example cutting fluids, rolling oils, polishing oils, etc., and in the pharmaceutical and cosmetics sector.

DESCRIPTION OF THE PREFERRED EMBODIMENTS

To study the efficacy of the novel treatment of the plant fiber particles, untreated plant fiber particles (Lignocel C 120) were compared with plant fiber particles treated according to the invention (Sample No. 1; Sample No. 2; Sample No. 3). The Samples No. 1 to No. 3 were treated as follows:

Sample 1: To produce the treated plant fiber particles, 330 g of wood fiber flour (particle range: 70–150 $\mu$m), 3700 ml of water and 15.8 g of solid sodium hydroxide were digested (reacted) in a mixing and treatment reactor at from 20° C. to 25° C. without additional heating and without stirring. The solids content was below 10% by weight, the retention time was at least 16 hours, the pH of the aqueous alkali solution was below 11.3 after 16 hours.

The sodium hydroxide solution was filtered off by vacuum via a plastic filter, the predried wet cake was slurried in hot water (70° C.), so that a solids content below 15% by weight was achieved. A final pH of from 3.0 to 7.0 was set using dilute hydrochloric acid and the solution was filtered off under vacuum via a plastic filter. The subsequent rinsing was performed at least twice each time with 200 to 500 ml of water at 70° C.

Sample 2 was treated with hot alkali solution and rinsed cold. In a mixing and treatment reactor at temperatures above 50° C. and with stirring 330 g of wood fiber flour (particle range: 70–150 $\mu$m), 3700 ml of water and less than 12 g solid sodium hydroxide were digested (reacted). The solids content was below 10% by weight; the retention time was at least 20 minutes; the pH value of the aqueous alkali solution was below 10.8 at the end of the experiment. The sodium hydroxide solution was filtered off under vacuum via a plastic filter; the predried wet cake was slurried in hot water (70° C.) so that a solids content below 15% by weight was achieved. A final pH ranging from 3.0 to 7.0 was set using dilute hydrochloric acid; and the solution was filtered off by vacuum via a plastic filter. The subsequent rinsing was performed at least twice each time with 200 to 500 ml of cold water at 20° C.

Sample 3 was produced at a pilot plant. The solids content was comparable with the laboratory batches. It was washed three times in cold water.

To determine the yield a thin layer of the resulting wet cake ranging from 5 to 10 mm was spread on a sheet and dried.

The degree of whiteness and the density was determined with this material.

The yield (on an absolutely dry basis) was at least 97% by weight, i.e. at most 3% by weight of the constituents of the wood fiber flour that was employed was released during the alkali solution treatment.

The sensorial test was conducted in an aqueous suspension, in which 1 g of product was suspended in 150 ml water at 100° C. With this suspension the smell and taste were tested.

To get an impression of what is still present in the untreated wood particle material (Lignocel C 120), on the one hand, and the wood particle material (sample nos. 1–3), subjected to the alkali solution treatment, the materials were subjected to an extraction in a Soxleth apparatus. The amount of the still extractive constituents present in the materials is a measure for the suitability of the material as a filter aid for sensorially challenging filtrations.

During the extraction operation in the Soxleth apparatus 5 g of the product dried to a moisture content below 10% by weight were extracted with 250 ml ethanol/water (1:1) for 5 hours; and the extract content was determined gravimetricly.

With the material dried to a moisture content below 10% by weight, a test filtration was subsequently conducted according to a procedure specified by the Schenk company at 20° C., in which procedure the wet cake height, the Darcy value, the fluming behavior, and the water value are determined.

The results of the test are compiled in the attached table.

The sensorial area was evaluated with numbers, where 0 denotes good, 10 denotes poor.

$$\text{water value} = \frac{76.8}{\text{time in minutes}}$$

Hence the shorter the time, required for a specific volume of water to flow through the filter layer, the higher is the water value.

TABLE

| Product | Moisture content % by weight | Odor | Flavor | Turbidity | Color | Extract Whiteness % | Bulk Density g/dm$^3$ | Wet cake height mm/25 g | Darcy Value | Incoming flow behavior | Water value min$^1$/25 g |
|---|---|---|---|---|---|---|---|---|---|---|---|
| Reference Lignocel C120 | 9.0 | 8 | 10 (bitter) | 8 (yellow) | 3.37 | 58.4 | 128 | 78 | 5.3 | good | 770 |
| Sample No. 1 | 3.5 | 1 | 2–3 (mild) | 1–2 (Colorless) | 0.93 | 34.2 | Not determined | 83 | 8.0 | good | 1098 |
| Sample No. 2 | 5.3 | 1 | 2–3 (mild) | 2 (Colorless) | 1.04 | 34.1 | 125 | 82 | 7.3 | good | 1010 |
| Sample No. 3 | 7.5 | 5 | 6 (neutral) | 2–3 (almost colorless) | 0.98 | 36.8 | 131 | 79 | 7.8 | good | 1125 |

The table shows that the untreated material with respect to odor exhibits a value 8, which is obviously worse than the value of the treated samples nos. 1–3.

The same applies to the flavor, which was virtually impossible to evaluate with the untreated product Lignocel C 120.

An important point is the amount of extract. In the untreated product Lignocel C 120 3.37% could still be extracted, whereas the equivalent values of treated products were 1.0%. This means that the relatively mild alkali solution treatment had already released a noticeable amount of the extractable constituents, a feature that may be a disturbing factor in the use of the product as a filter aid.

The alkali solution treatment of the product and the subsequent washing operations make it possible to affect somewhat the water value, which is a measure for the permeability of the filter aid. The water value is determined with a laboratory pressure filter (diameter 50 mm) and an elevated water tank with level control. Between the level of the water in the elevated water tank and the filter bottom a difference of 2 m must be maintained.

The laboratory filter is provided and sealed with a moistened permeable layer of cellulose (Schenk D layer with the screen side downward). Then 25 g of filter aid are slurried in 200 to 300 ml pure water and completely transferred into the lab filter. The lab filter is attached to the elevated water tank and purged. After one minute 500 ml water are removed via a filter and then the time for the next 100 ml filtrate stopped. The water value follows from the stopped time as follows:

$$\text{water value} = \frac{480}{\text{time in minutes}}$$

If the result is a water value of less than 150, the determination is done as above, but with the use of only 4 g of filter aid. Then the result is:

What is claimed is:

1. Filter aid which comprises finely divided wood particles which have been subjected to a chemical liquid treatment, and washing and drying, that removes sensorially active substances therefrom, wherein the particles are subjected to a treatment with a dilute alkali solution at a temperature below 100° C. and at atmospheric pressure, to a degree sufficient to remove the sensorially active substances from the wood particles and leave the wood particles as wood particles.

2. Filter aid according to claim 1, wherein the finely divided wood particles comprise wood fibers.

3. Filter aid according to claim 1, wherein the finely divided wood particles comprise wood comminution residues.

4. Filter aid according to claim 1, wherein the finely divided wood essentially comprises only wood particles of one and the same type, size distribution and pretreatment.

5. Filter aid according to claim 1, wherein the finely divided wood comprises at least two fractions of particles comminuted by different processes.

6. Filter aid according to claim 1, wherein the finely divided wood comprises at least two fractions of wood particles comminuted to different dimensions.

7. Filter aid according to claim 1, wherein the finely divided wood comprises fractions of wood particles produced from at least two different starting materials.

8. Filter aid according to claim 1, wherein the filter aid comprises other organic or inorganic fractions which do not affect the filtration properties.

9. Filter aid according to claim 1, wherein the filter aid comprises at least one other filter-active fraction.

10. Filter aid according to claim 1, wherein the filter aid comprises other mineral fractions.

11. Filter aid according to claim 9, wherein the at least one other filter-active fraction comprises kieselguhr.

12. Filter aid according to claim 9, wherein the at least one other filter active fraction comprises perlite.

13. Filter aid according to claim 1, wherein a mean particle dimension of the filter aid is below 3.0 mm.

14. Filter aid according to claim 2, wherein a mean fiber diameter of the wood fibers is below 1.0 mm.

15. Filter aid for use in forming a prefloat filter layer for filtration of liquids comprising finely divided wood particles which have been subjected to a chemical liquid treatment, and washing, neutralizing, and drying, that removes sensorially active substances therefrom, wherein the wood particles are subjected to a treatment with a dilute alkali solution at a temperature below 100° C. and at atmospheric pressure, to a degree sufficient to remove the sensorially active substances from the wood particles and leave the wood particles as wood particles.

16. Filter aid according to claim 15, wherein a mean particle dimension is below 3.0 mm.

17. Filter aid according to claim 1, wherein a lignin content in the wood particles after the treatment, is substantially unchanged with respect to the lignin content in the wood particles before the treatment.

18. Filter aid according to claim 1, wherein the wood particles after the treatment remain as loose wood particles with a wood character.

19. A filter aid, for use as a beverage filtering prefloat filter layer, comprising:
finely divided lignin-containing wood particles treated with a dilute alkali solution at a temperature below 100° C. and at atmospheric pressure, to a degree:
a) sufficient to remove the sensorially active substances from the wood particles,
b) insufficient to quantitatively extract lignin from the wood particles, and to
c) leave the wood particles as loose wood particles with a wood character adapted to filter a beverage in the beverage filtering prefloat filter layer.

20. A filter comprising:
finely divided wood particles which have been subjected to a chemical liquid treatment that removes sensorially active substances therefrom, wherein the wood particles are subjected to a treatment with a dilute alkali solution at a temperature below 100° C. and at atmospheric pressure, to a degree
a) sufficient to remove the sensorially active substances from the wood particles,
b) insufficient to quantitatively extract lignin from the wood particles and to
c) leave the wood particles as wood particles,
wherein the finely divided wood particles have a moisture content of less than 10% by weight.

21. A filter aid according to claim 1, wherein the dry finely divided wood particles have a moisture content of less than 10% by weight.

22. A filter aid according to claim 1, wherein the finely divided wood particles have a neutral to acid pH.

23. A filter aid according to claim 1, wherein the finely divided wood particles are subjected to neutralization after being subjected to the treatment with the dilute alkali.

24. A filter aid according to claim 1, wherein the finely divided wood particles have a water value ranging from 1010 to 1125.

25. A filter aid according to claim 15, wherein the dry finely divided wood particles have a moisture content of less than 10% by weight.

26. A filter aid according to claim 15, wherein the finely divided wood particles have a water value ranging from 1010 to 1125.

27. A filter aid according to claim 19, wherein the wood particles are subject to drying after being subjected to the treatment with the dilute alkali.

28. A filter aid according to claim 27, wherein the dry wood particles have a moisture content of less than 10% by weight.

29. A filter aid according to claim 19, wherein the wood particles have a neutral to acid pH.

30. A filter aid according to claim 19, wherein the finely divided wood particles are subjected to neutralization after being subjected to the treatment with the dilute alkali.

31. A filter aid according to claim 30, wherein the finely divided wood particles are dried after being subjected to the treatment with the dilute alkali.

32. A filter aid according to claim 19, wherein the finely divided wood particles have a water value ranging from 1010 to 1125.

33. A filter aid according to claim 20, wherein the finely divided wood particles have a water value ranging from 1010 to 1125.

34. A filter aid arrangement comprising:
a beverage; and, in contact therewith,
a filter aid for filtering the beverage, comprising finely divided wood particles which have been subjected to a chemical liquid treatment that removes sensorially active substances therefrom, wherein the particles are subjected to a treatment with a dilute alkali solution at a temperature below 100° C. and at atmospheric pressure, to a degree sufficient to remove the sensorially active substances from the wood particles and leave the wood particles as wood particles.

* * * * *